June 28, 1932. R. N. GRAHAM 1,864,815
CHLORINE METER
Filed April 7, 1928 2 Sheets-Sheet 1

INVENTOR:
Robert N. Graham,
BY
Byrnes Townsend & Brickenstein,
ATTORNEYS.

Patented June 28, 1932

1,864,815

UNITED STATES PATENT OFFICE

ROBERT N. GRAHAM, OF SOUTH CHARLESTON, WEST VIRGINIA, ASSIGNOR TO CARBIDE & CARBON CHEMICALS CORPORATION, A CORPORATION OF NEW YORK

CHLORINE METER

Application filed April 7, 1928. Serial No. 268,305.

My invention relates to measuring apparatus, and particularly to new and improved devices for the measurement of the pressure, rate of flow, and total quantity of gaseous chlorine.

The manufacturing of chlorine has come to be a major industrial activity, but because of the extremely corrosive character of the gas, great difficulty has been experienced in the handling and manipulation of it, especially in the measurement of the pressures under which it is handled, the rate of flow in conduits, and the quantities of the gas manufactured and packaged.

My invention provides new and improved means and devices for the measurement of the rate of flow and of the pressure of the gas, from which measurements the quantity of gas is readily determined by well known computations. My invention comprises a flow meter having incorporated means for preventing corrosion, and injury to the accuracy of measurement thereof by the corrosive gas measured, means also resistant to corrosion, for measuring the pressure of the gas flowing, and means for recording both measurements simultaneously upon a single chart, from which by appropriate integration methods the quantity passed in a given time interval may be computed.

Other objects and structural details of my invention will be apparent from the following description when read in connection with the accompanying drawings wherein.

Figure 1:
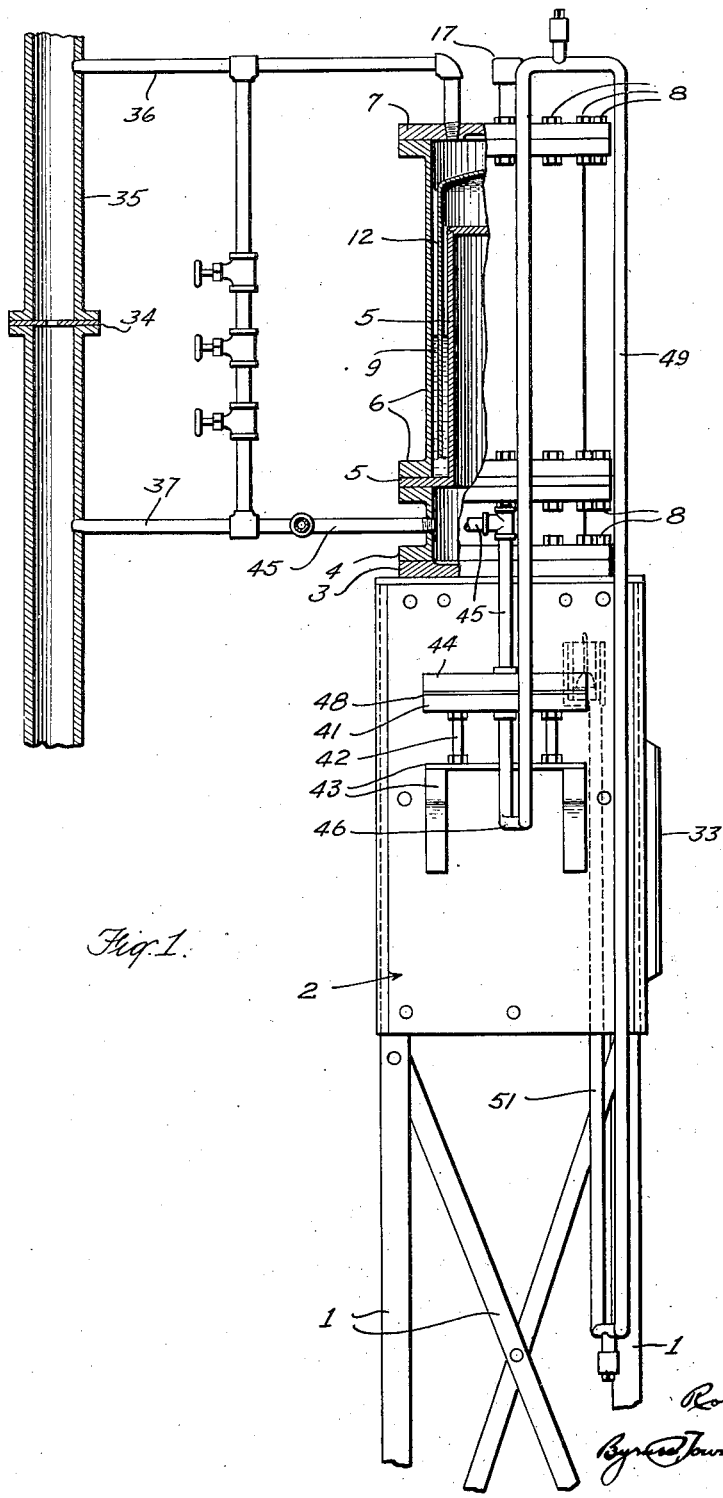
Figure 1 is a vertical side view, partly in section, of the device of my invention.

Referring to the figures, I provide a supporting frame comprising the members 1, which may desirably be formed of angle and bar iron. Upon the upper end of the frame I mount a cabinet or case 2 within which the chart and pen mechanism, as well as other members are positioned. Upon the top of the cabinet portion 2, I mount a cylinder and bell construction which is adapted to receive the flow measuring members. The cylinder construction comprises a base-plate member 3, upon which is positioned a bottom cylinder 4, carrying at its upper end an inner drum 5, and an outer drum 6, which in turn is closed by a plate 7 at the top, the various members being joined by bolts 8 as indicated.

The annular space between the cylinders 5 and 6 is filled with a convenient liquid 9, which is unaffected by chlorine, as for example, carbon tetrachloride or a suitable hydrocarbon oil. A liquid level gauge 11 may desirably be provided to show the presence and quantity of the contained liquid, but it is not an essential part of the device of my invention.

A bell member 12 is positioned within the cylinder 6, surrounding the cylinder 5, with its lower edge immersed in the liquid 9 as indicated. The bell 12 is mounted upon a carrying rod 14 which extends through a guide and seal device 15 in the bottom plate 3. The rod 14 desirably passes with a very loose fit through a covered member 16 on the top of the cylinder 5 and is desirably guided very loosely by a guide member 17 mounted in the top plate 7.

The guide 15 desirably consists of a tubular member 18 and a pair of bushings 19 and 21 at the top and bottom respectively of the member 18. These bushings desirably make a close fit to the rod 14 and are desirably formed of the metal tantalum, which is found to be resistant to the corrosive effects of gaseous chlorine even when moist. The rod 14 may also be made of tantalum if desired, and a relatively few thousandths of an inch clearance may be allowed between the rod and the perforations through the bushings 19 and 21.

In order to prevent the outflow of chlorine through the clearance space between the bushings 19 and 21 and the rod 14 it is found desirable to provide a substitute gas at the space 22 within the tube 18 between the bushings 19 and 21. This substitute gas is desirably introduced through the tube 23 and may consist of any convenient inert gas, such as nitrogen or other suitable substance. I find that nitrogen is the preferable gas, but that a mixture of hydrogen and methane may also be used when such mixture is conveniently available. The pressure of the gas may be adjusted to a value closely approximating that of the pressure of the chlorine within the cylinder 5. By this arrangement, a minimum amount of diluting gas passes inward to mix with the chlorine in the cylinder, and only the inert gas passes outward through the bushing 21 to the surrounding atmosphere. Furthermore since there is no flow of chlorine through the cylinder 5, entrance of the inert gas to the cylinder merely displaces the chlorine therefrom, and if the pressure of the gas in the tube 23 is adjusted to a value which is close to the average pressure in the cylinder 5 as by means of a suitable pressure regulator, the inert gas will, during some portion of the time when its pressure is higher than that of the chlorine, be passing inward through the bushing 19 and during other portions will be passing outward through the bushing 19 and accordingly an entirely negligible quantity of the inert gas is added to the gas flowing past the meter for packaging. (It is of course possible to provide automatic adjusting means such that the pressure in the space 22 is maintained closely equal to the pressure in the cylinder 5 at all times, under which condition practically no substitute gas passes to the chlorine flow. I have not however, found such an arrangement necessary.)

To carry the weight of the cylinder 12 and the cooperating parts, I provide a mercury well 24, supported by tie-rods 25 from the base plate 3 and containing a quantity of mercury 26. An iron float member 27 is provided, attached to the rod 14 near its lower end and positioned within the float chamber 24 and the mercury 26. This construction carries the weight of the bell 12 and leaves it free to move upward or downward readily by the action of small forces.

Figure 2:
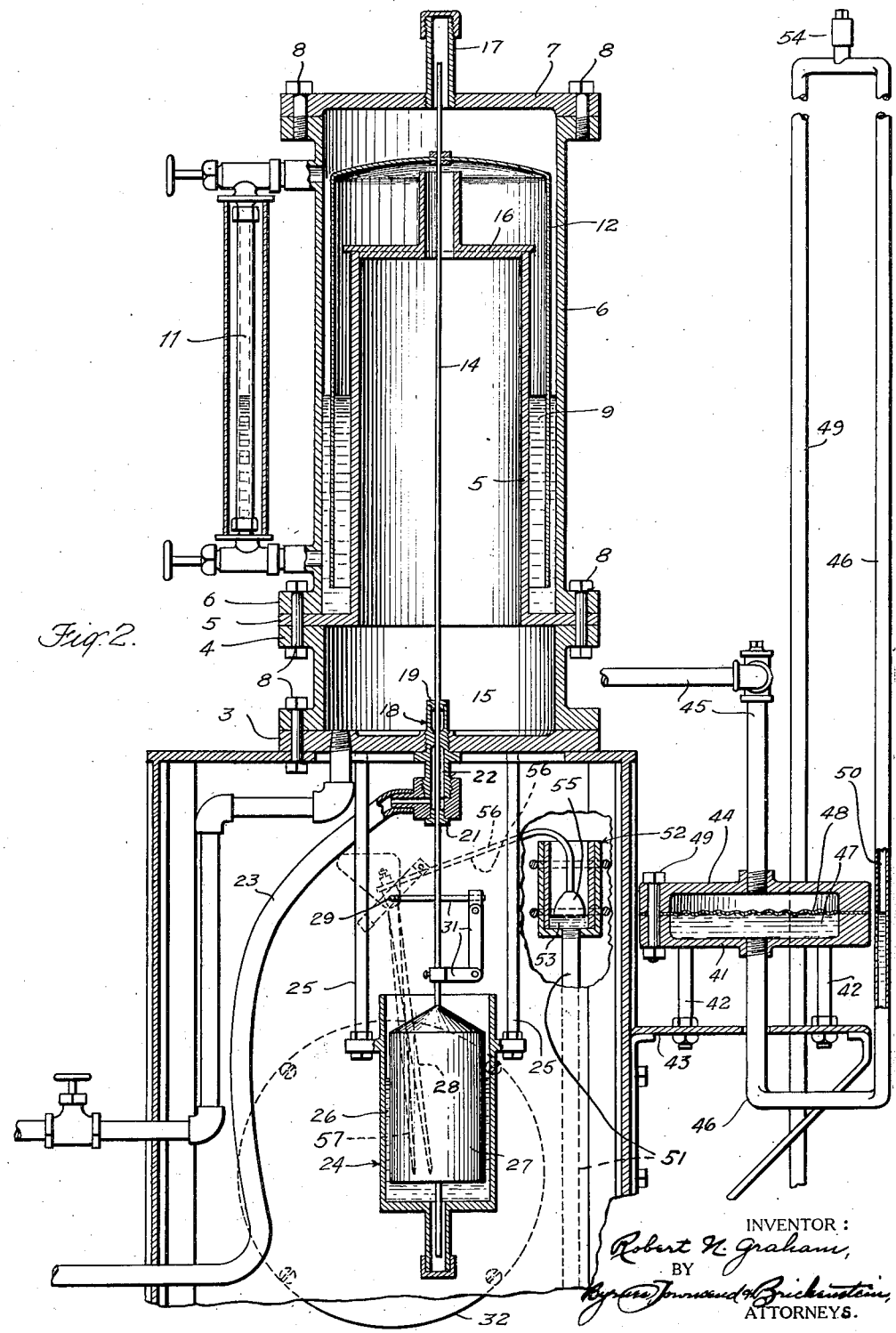
Figure 2 is a front sectional view of the same embodiment on a slightly larger scale.

A clock and rotating disc mechanism for the carrying and moving of a paper chart is provided according to the prior art, and a pen member 28 is provided, mounted upon appropriate pivots 29 and operated by levers and links 31 which are attached, as indicated, to the rod 14 so that an up and down movement of the rod 14 moves the pen 28 radially across the chart. The chart is indicated by the circle 32 in Figure 2 and by the glass-face-ring 33 in Figure 1. Since, however, this chart and clock system is well known in the prior art it is not here shown in detail.

A standardized orifice plate 34 is provided and mounted within the conductor pipe 35 through which the chlorine is flowing. This orifice, as is well known in the art, produces a definite pressure drop between opposite sides thereof which is proportional to the rate of flow of the gas therethrough. The orifice plate 34 is desirably formed of nickel or Monel metal, since such metals show a high resistance to corrosion by dry chlorine. Pipe connections 36 and 37 are led from the conductor pipe 35 on opposite sides of the orifice plate 34 to the measuring cylinder, the pipe 36 being led to the cylinder 6 by way of an opening in the cover plate 7 so as to apply the pressure from one side of the orifice plate 34 to the outside of the bell 12. The pipe 37 is led to the inside of the cylinder 5 through an opening in the cylinder 4 so as to apply the pressure from the other side of the orifice plate 34 within the bell 12. The differential pressure produced by the flow of the gas through the orifice 34 is thus effective to raise or lower the bell 12, the rod 14, and the float 27 and to produce a movement of the pen arm 28, giving a corresponding trace upon the chart and showing the rate of flow of the gas through the conduit 35.

This construction of the orifice is particularly desirable for dry gaseous chlorine which shows relatively little corrosive effect upon the more common metals such as iron, the nickel or Monel metal being particularly suitable because of the excellent resistance to corrosion by the dry chlorine. If it is required to measure moist chlorine, materials showing higher resistance properties are essential, such as glass or stone-ware conduits. Under such conditions the orifice plate may be formed of the glass or stone-ware, if extreme accuracy is not required. Alternatively the orifice plate may be formed from tantalum because of its ease of working, and its high resistance to the chlorine.

A record of the rate of flow will not, however, show the quantity of gas passing, since the quantity depends not only on the rate of flow but also on the pressure. Accordingly, the device of my invention comprises also a recording pressure gauge having certain new and valuable features, for providing a pressure record upon the same chart which receives the rate of flow record.

The pressure recording member of the device of my invention desirably comprises the cup-shaped member 41, which may desirably be mounted by studs 42 and a bracket 43 upon the side of the case member 2. A cover member 44 is also provided and connected by pipe member 45 to the conduit 35. A U tube member 46 is provided entering the member 41 at a convenient point. The tube 46 and the cup member 41 are filled with mercury 47 and a diaphragm member 48 is positioned over the mercury, and clamped between the member 41 and cover 44, by the bolts 49. The cup member 41 is desirably made of considerable size as compared to the sectional area of the tube 46 in order to provide an ample supply of mercury therein, and the diaphragm 48 is so constructed as to provide considerable freedom of movement, either by its inherent elasticity or by the provision of corrugations therein. The tube 46 is extended upward into a relatively high inverted U, and then brought downward in a descending leg 49 as indicated, which descending leg desirably is also extended to a point considerably below the chamber 41. The descending leg 49 is then turned upward as a second ascending leg 51, and connected to a float chamber 52, about on a level with the chamber 41. The ascending leg 51, the float chamber 52 and the lower portion of the descending leg 49 are filled with mercury 53, and the inverted U consisting of the upper portions of the tubes 46 and 49 is filled with water 50 through a filler cap 54. This construction forms a compound mercury U tube which gives a smaller change in level with a given pressure change than is obtainable with a single U tube.

A float member 55 is positioned within the float chamber 52 and connected by a lever 56 to a second pen arm 57 mounted upon the pivots 29, to make a trace over the chart 32 as previously described.

The pressure of the gas is applied through the pipe 45 to the diaphragm 48, and through it to the mercury 47, producing a displacement thereof, a displacement of the water 50 in the upper end of the inverted U and a movement of the mercury 53 in the float chamber 52 which in turn moves the lever 56 and pen arm 57 to produce a pressure trace upon the chart. The pipe 45 may run to either the high or low pressure side of the orifice plate 34, but it is somewhat easier to interpret the indications of the meter if it is the high pressure which is recorded.

By the construction as thus described I am enabled to obtain upon a single chart, a pressure record and a rate of flow record, by a device which is corrosion proof, and which retains its accuracy of recording over a considerable period of time.

While I have shown but a single embodiment of the device of my invention it is capable of other modifications therefrom without departing from the spirit thereof, and it is desired therefore that only such limitations shall be applied to the appended claims as are indicated therein, or required by the prior art.

I claim as my invention:

1. In a device for measuring gas pressure, a pressure chamber, a bell arranged to rise and fall therein with fluctuations in the difference in pressure between the interior and exterior of the bell, a liquid in the pressure chamber sealing said bell, counterbalancing means for said bell outside said pressure chamber, a rod passing through the wall of the pressure chamber to communicate the motion of the bell to the counterbalancing means, guide and seal means engaging said rod where it emerges from the pressure chamber, said means comprising spaced portions loosely fitting said rod, and means for introducing inert gas into said guide and seal means between said spaced portions, whereby said rod is enabled to move freely through said guide and seal means without escape of gas from said pressure chamber.

2. In a measuring device, a gas chamber, means within said chamber adapted to be moved by changes in gas pressure, a rod connected to said means and passing through the wall of said gas chamber, guide and seal means engaging said rod where it emerges from the gas chamber, said means comprising spaced portions loosely fitting said rod, and means for introducing into said guide and seal means between said spaced portions a different gas from that being measured, whereby said rod is enabled to move freely through the said guide and seal means and whereby a non-toxic gas may be introduced into the seal means while a toxic gas is being measured, so that the toxic gas will not escape from said gas chamber.

3. In a measuring device, a gas chamber, means within said chamber adapted to be moved by changes in gas pressure, a rod connected to said means and passing through the wall of said gas chamber, guide and seal means engaging said rod where it emerges from the gas chamber, said means comprising spaced bushings loosely fitting said rod, there being a gas space around the rod between said bushings, and means for introducing into said space a different gas from that being measured, whereby said rod is enabled to move freely through said guide and seal means and whereby a non-toxic gas may be introduced into said space while a toxic gas is being measured, so that the toxic gas will not escape from said gas chamber.

In testimony whereof, I affix my signature.

ROBERT N. GRAHAM.